United States Patent [19]
Shiue et al.

[11] Patent Number: 5,640,778
[45] Date of Patent: Jun. 24, 1997

[54] APPARATUS AND A METHOD FOR MEASURING THE CURVATURE RADII OF SPHERICAL AND CYLINDRICAL SURFACES

[75] Inventors: Shin-Gwo Shiue, Hsinchu Hsien; Tai-San Liao, Taichung; Sheng-Tsang Chang; Ching-Fen Kao, both of Hsinchu, all of Taiwan

[73] Assignee: National Science Council, Taiwan, Taiwan

[21] Appl. No.: 559,288

[22] Filed: Nov. 15, 1995

[51] Int. Cl.[6] .............................. G01B 5/213; G01B 5/22
[52] U.S. Cl. .............................. 33/507; 33/550; 33/555.1; 33/832
[58] Field of Search .............................. 33/507, 549, 550, 33/555.1, 555.3, 558.2, 832, 833, 555, 572, 573, 28

[56] References Cited

U.S. PATENT DOCUMENTS

| | | | |
|---|---|---|---|
| 2,785,474 | 3/1957 | Mages et al. | 33/550 |
| 2,855,687 | 10/1958 | Price | 33/555.3 |
| 3,439,430 | 4/1969 | Harris | 33/555.1 |
| 3,848,339 | 11/1974 | Strasbaugh | 33/832 |
| 5,317,811 | 6/1994 | Berwick | 33/533 |

*Primary Examiner*—Christopher W. Fulton
*Attorney, Agent, or Firm*—Michael D. Bednarek; Kilpatrick Stockton LLP

[57] ABSTRACT

An apparatus for measuring the curvature radii of spherical and cylindrical surfaces is provided. The apparatus comprises a base, a probe and four ball rings of the same size, wherein the four ball rings are provided on the base and arranged into a square having a side length C. The probe is upward and downward movably mounted on the top surface of the base at the center of the square. There is also provided a method for measuring the curvature radii of spherical and cylindrical surfaces, wherein a ball-ring-distance is equal to C for the cylindrical surface or is equal to $\sqrt{2}C$ for the spherical surface.

3 Claims, 3 Drawing Sheets

1

APPARATUS AND A METHOD FOR MEASURING THE CURVATURE RADII OF SPHERICAL AND CYLINDRICAL SURFACES

BACKGROUND OF THE INVENTION

1. Field of the Invention

The present invention relates to an apparatus and a method for measuring the curvature radii of spherical and cylindrical surfaces.

2. Description of Prior Art

Based on the principle of trigonometric functions, as shown in FIG. 1, the curvature radius of a spherical or cylindrical surface is given by:

$$R = \frac{h}{2} + \frac{D^2}{8h} - r \quad (1)$$

wherein h is the sagittal depth;

D is the ball-ring-distance over which the measure is made;

r is the radius of each of the ball rings.

A conventional contact-type measuring apparatus comprises three similar ball rings which are arranged into a equilateral triangle having a side length D. When a spherical lens is measured, it is put on the measuring apparatus and supported by the three identical ball rings. A probe is movably mounted at the center of the equilateral triangle for measuring the sagittal depth h. The radius r of the ball rings is known and thus the curvature radius R can be found according to the above equation (1). However, the conventional measuring apparatus can not be utilized to measure the curvature radius of a cylindrical surface because a cylindrical lens can not be stably supported by the three ball rings of the conventional measuring apparatus.

SUMMARY OF THE INVENTION

An object of the present invention is to provide an apparatus which is adapted for measuring the curvature radii of spherical and cylindrical surfaces.

In accordance with the object of the present invention, there is provided an apparatus for measuring the curvature radii of spherical and cylindrical surfaces. The apparatus comprises a base, a probe and four ball rings with the same size, wherein the four ball rings are provided on the base and arranged into a square having a side length C. The probe is upward and downward movably mounted on the top surface of the base at the center of the square.

Also, there is provided a method for measuring the curvature radii of spherical and cylindrical surfaces. The method comprises the following steps of:

preparing an apparatus for measuring the curvature radii of spherical and cylindrical surfaces as metioned above;

preparing a spherical lens or a cylindrical lens;

putting the spherical lens or the cylindrical lens on the apparatus, with the lens supported by the four ball rings, to lower the probe to a distance h; and calculating the curvature radius of the spherical lens or the cylindrical lens according to the equation as follows:

$$R = \frac{h}{2} + \frac{D^2}{8h} - r$$

wherein

R is the curvature radius of the spherical lens or the cylindrical lens;

h is the lowered distance of the probe;

D is equal to $\sqrt{2}C$ for the spherical lens or is equal to C for the cylindrical lens;

r is the radius of each of said ball rings.

BRIEF DESCRIPTION OF THE DRAWINGS

The present invention can be more fully understood by reading the subsequent detailed description and examples with references made to accompanying drawings, wherein.

DETAILED DESCRIPTION OF THE PREFERRED EMBODIMENT

Figure 1:
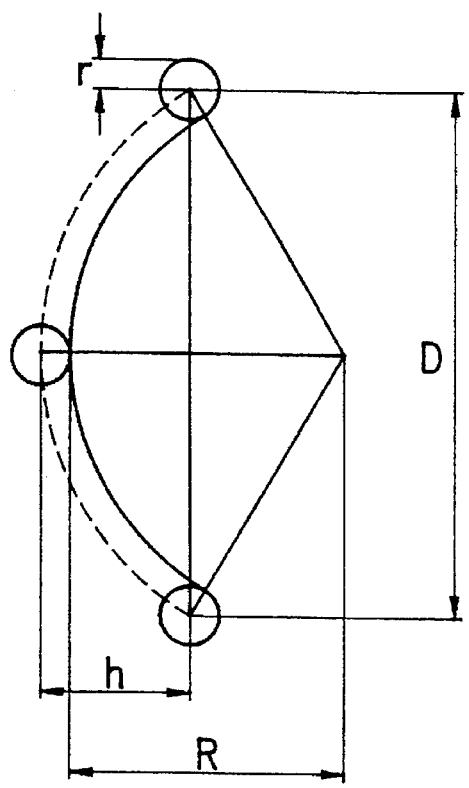
FIG. 1 depicts the principle of the trigonometric functions for measuring the curvature radii of spherical and cylindrical surfaces.
Figure 2A:
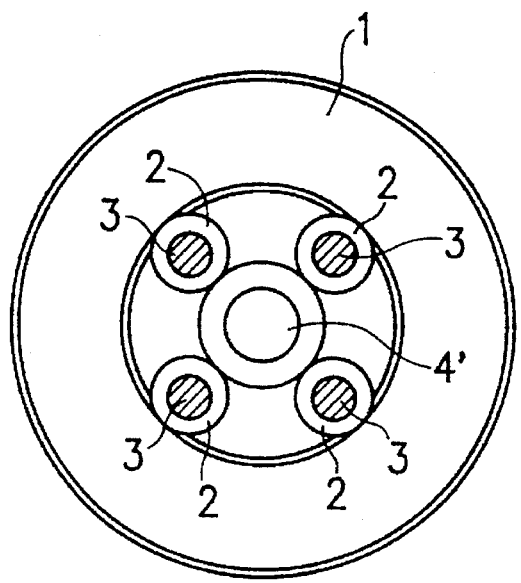
FIG. 2A is a top view of a base of a measuring apparatus according to the preferred embodiment of this invention.
Figure 2B:
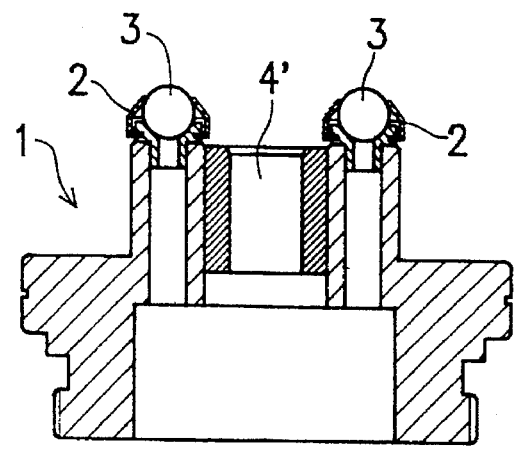
FIG. 2B is a longitudinal sectional view of the base according to FIG. 2A.
Figure 3:
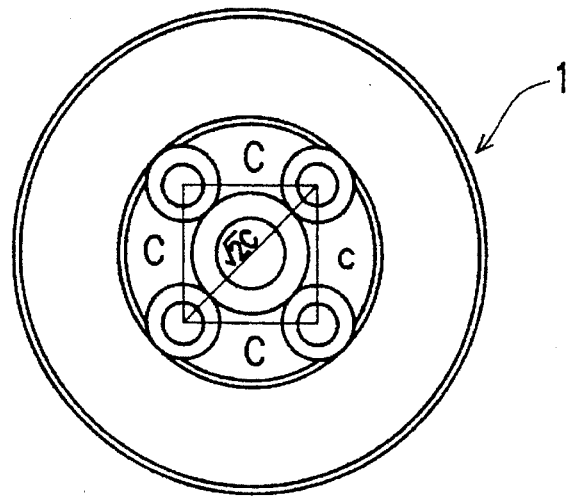
FIG. 3 shows four ball rings of the base according to FIG. 2A, which are arranged into a square having a side length C and a diagonal length $\sqrt{2}C$.
Figure 4:
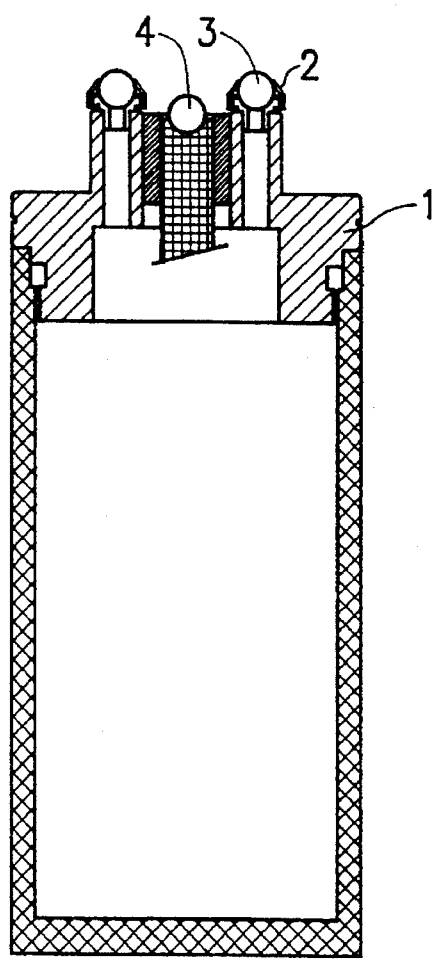
FIG. 4 is a longitudinal sectional diagram of the measuring apparatus according to the preferred embodiment of this invention.
Figure 5:
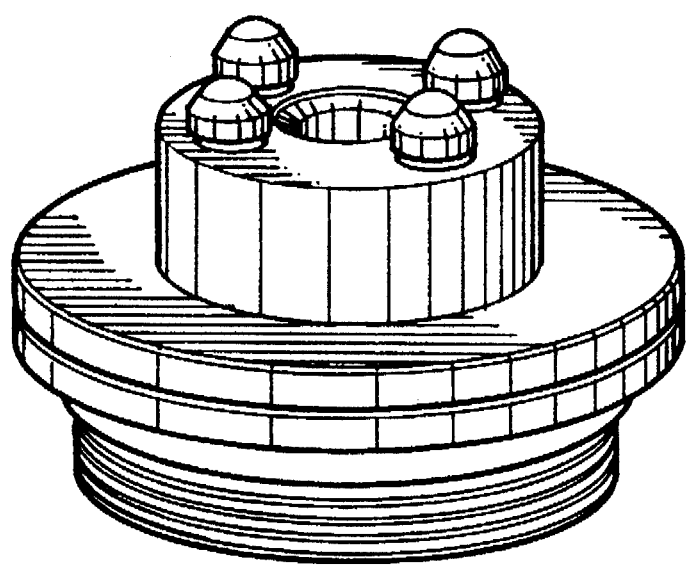
FIG. 5 is a photograph of a base of the measuring apparatus according to the preferred embodiment of this invention.

Please refer to FIG. 2A, 2B, 3 and 4, in which the measuring apparatus according to the embodiment of this invention is provided with a base 1. FIG. 5 is the photograph of the base 1. Four sockets 2 are mounted on the top surface of the base 1 with four identical ball rings 3 respectively received therein. It is noted that the four ball rings 3 are arranged into a square having a side length C and a diagonal length $\sqrt{2}C$. Also, a probe 4 is upward and downward movably mounted in a hole 4' which is provided on the top surface of the base 1 at the center of the square. The structure of the lower portion of the probe 4 is the same as that of the prior art and is well known. Therefore, the relative description is omitted.

The apparatus of this invention can be utilized for measuring a spherical lens or a cylindrical lens. The cylindrical lens can be put on the top surface of the apparatus and stably supported by the four ball rings 3 while it is measured. At this time, the cylindrical lens presses the probe 4 down to a distance h (h is called sagittal depth). The curvature radius of the cylindrical lens is thus found according to the above equation (1), wherein the ball-ring-distance D is equal to C (C is the side length of the square).

If a spherical lens is measured, the four ball rings 3 of the apparatus can also provide stable support. The curvature radius of the spherical lens is determined according to equation (1). However, it is noted that the current ball-ring-distance D is equal to the diagonal length $\sqrt{2}C$ instead of the side length C.

Although this invention has been described in its preferred forms and various examples with a certain degree of particularity, it is understood that the present disclosure of the preferred forms and the various examples can be changed in the details of construction. The scope of the invention should be determined by the appended claims and not by the specific examples given herein.

What is claimed is:

1. An apparatus for measuring the curvature radii of spherical and cylindrical surfaces, comprising:
   a base;
   four ball rings having the same size, which are provided on said base and arranged into a square having a side length C; and
   a probe upward and downward movably mounted on the top surface of said base at the center of said square.

2. A method for measuring the curvature radii of spherical and cylindrical surfaces, comprising:
   preparing an apparatus as claimed in claim 1 and a spherical lens;
   putting said spherical lens on said apparatus, with said spherical lens supported by said ball rings, to lower said probe to a distance h; and
   calculating the curvature radius of said spherical lens according to the equation as follows:

$$R = \frac{h}{2} + \frac{D^2}{8h} - r$$

wherein

R is said curvature radius of said spherical lens;

D is equal to $\sqrt{2}C$;

r is the radius of each of said ball rings.

3. A method for measuring the curvature radii of spherical and cylindrical surfaces, comprising:
   preparing an apparatus as claimed in claim 1 and a cylindrical lens;
   putting said cylindrical lens on said apparatus, with said cylindrical lens supported by said ball rings, to lower said probe to a distance h; and
   calculating the curvature radius of said cylindrical lens according to the equation as follows:

$$R = \frac{h}{2} + \frac{D^2}{8h} - r$$

wherein

R is said curvature radius of said cylindrical lens;

D is equal to C;

r is the radius of each of said ball rings.

* * * * *